April 9, 1957 E. C. HOLIDAY 2,787,825
WORK HOLDING FIXTURE
Filed April 27, 1954
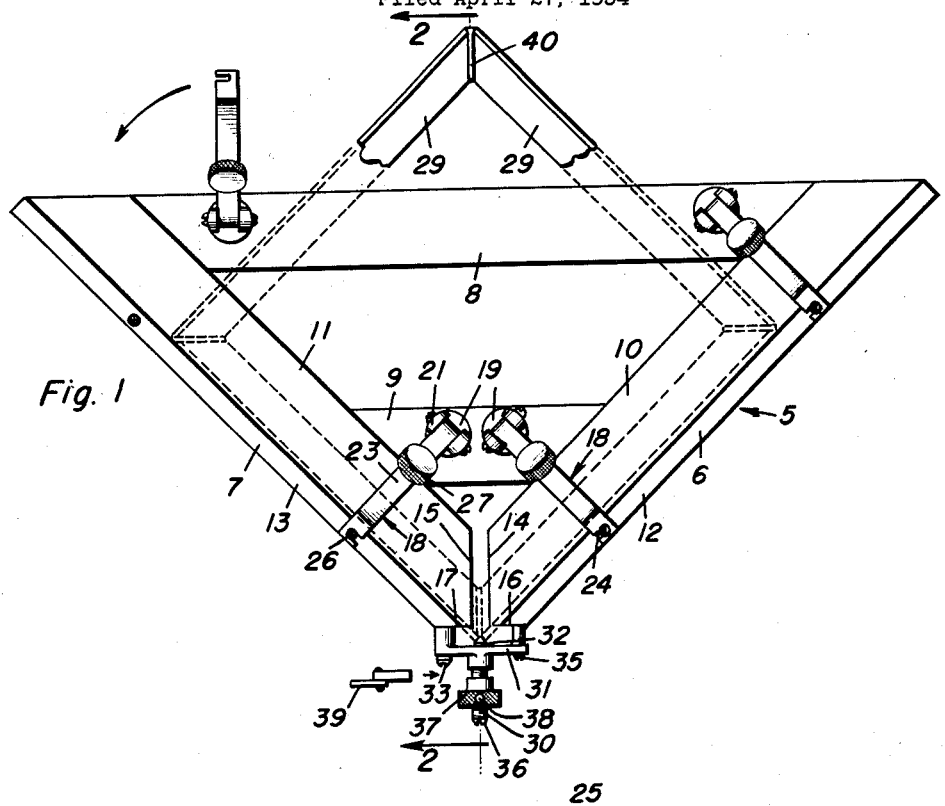
Fig. 1
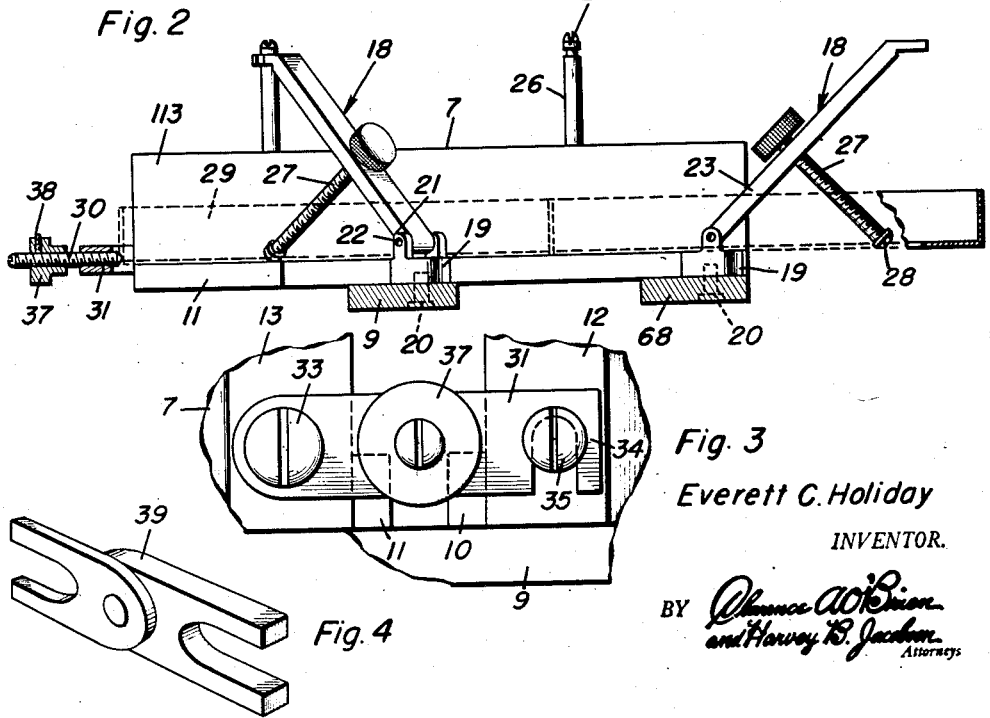
Fig. 2
Fig. 3
Fig. 4
Everett C. Holiday
INVENTOR.
BY

United States Patent Office 2,787,825
Patented Apr. 9, 1957

2,787,825

WORK HOLDING FIXTURE

Everett C. Holiday, Greenville, S. C.

Application April 27, 1954, Serial No. 426,004

4 Claims. (Cl. 29—286)

The present invention relates to new and useful improvements in work holding fixtures for use in clamping and fabricating sections of a frame in position while welding the meeting ends of the frame section to each other.

An important object of the invention is to provide a working holding fixture of this character composed of a pair of angle iron members positioned at right angles to each other and with their meeting ends spaced apart to facilitate welding the adjacent ends of frame members clamped in the fixture, and further to provide a latch device for an adjustable center stop to provide an accurate weld at each corner of the frame.

A further object is to provide a device of this character of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view;

Figure 2 is an enlarged sectional view taken on a line 2—2 of Figure 1;

Figure 3 is an enlarged end elevational view of the pivoted latch for the center stop; and Figure 4 is an enlarged perspective view of the gage for adjusting the center stop.

Referring now to the drawing in detail wherein for the purpose of illustration I have disclosed a preferred embodiment of the invention, the numeral 5 designates the work holding fixture or jig generally and which comprises a pair of angle iron members 6 and 7 secured in a position at right angles to each other by cross bars 8 and 9 which are welded or otherwise suitably secured to the underside of the horizontal flanges 10 and 11 of the members 6 and 7 and with the vertical flanges 12 and 13 of said members positioned at the outermost edges of the fixture or jig.

The adjacent ends of the members 6 and 7 are mitered as indicated at 14 and 15 and spaced from each other. The adjacent ends of the upstanding flanges 12 and 13 are also cut at an angle, as indicated at 16 and 17 at right angles to the mitered end portions 14 and 15.

A pair of clamps designated generally at 18 are secured to each of the cross bars 8 and 9 adjacent the respective fixture or jig members 6 and 7 and each clamp includes a base 19 which is rotatably secured on top of its related cross bar by a screw, or the like, 20. Base 19 is formed with a pair of upstanding apertured ears 21 to receive a pin 22 and on which the inner end of an arm 23 is pivotally connected for vertical swinging movement. The outer end of the arm 23 is formed with a hook 24 adapted for engaging a screw 25 threaded into the upper end of a post 26 rising from the vertical flange of the adjacent jig or fixture member. A clamping screw 27 is threaded downwardly through an intermediate portion of the arm 23 and is formed at its lower end with a head 28 adapted for clamping in the angle of an angle iron frame member 29 for clamping the frame member on one of the fixture or jig members 6 or 7.

The meeting ends of the frame members 29 are spaced apart and centered between the spaced apart meeting ends of the fixture or jig members 6 and 7 by means of an adjustable stop 30 which is threaded through the center portion of a pivoted latch 31 and with a conical or tapered end portion 32 at one end of the stop positioned between the meeting ends of the frame members 29 to adjust the latter in spaced relation with respect to each other to receive a weld 40.

One end of the latch bar 31 is pivoted on a screw 33 threaded in the end of the vertical flange 13 of fixture or jig member 7 while the other end of the latch bar is formed with a hook 34 adapted for lockably engaging a screw 35 threaded in the end of the vertical flange 12 of fixture or jig member 6. Screws 33 and 35 may be tightened to lock the latch bar 31 while the frame members 29 are being clamped in the fixture or jig.

The outer end of the adjustable stop 30 is formed with a screwdriver engaging slot 36 and a nut 37 is threaded on the stop 30 and secured in adjusted position thereon by a setscrew 38.

A thickness gauge 39 is positioned between the nut 37 and latch bar 31 to indicate the adjustment for center stop 30 to regulate the spacing of the meeting ends of the frame members 29 to provide a uniform weld for the several corners of the frame assembled in the fixture.

After placing the frame members 29 in the fixture or jig members 6 and 7 and with the meeting ends of the frame members abutting the tapered end 32 of the center stop 30 to space the ends of the frame members a predetermined distance from each other, the clamps 18 are swung into locking engagement with the screws 25 and tightened to hold the frame members rigid in the fixture or jig 5. The latch 31 is then released and swung toward one side whereupon the meeting ends of the frame members may be welded.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A work holding fixture comprising a pair of fixture frame members of angle construction in cross-section, means rigidly securing said frame members to each other in coplanar relation and at right angles to each other and with their adjacent ends spaced apart, work clamping means carried by the fixture and adapted for clamping individual work to each member for assembly in the fixture, a latch bar pivoted to one of the fixture frame members and lockably secured to the other frame member in bridging relation at the spaced apart ends of the latter, and a tapered center stop carried by the latch bar and adapted to enter between the adjacent ends of the frame members for engaging both meeting ends of the work.

2. A work holding fixture comprising a pair of fixture frame members of angle construction in cross-section, means rigidly securing said frame members to each other in coplanar relation and at right angles to each other and with their adjacent ends spaced apart, work clamping means carried by the fixture and adapted for clamping individual work to each member for assembly in the fixture, a latch bar pivoted to one of the fixture frame members and lockably engaged in bridging relation with the other fixture frame member, and a tapered center stop adjustably carried by the latch bar for inward and outward adjustment between the adjacent ends of the frame members to engage both meeting ends of the work to vary the spacing of the individual work relative to each other.

3. A work holding fixture comprising a pair of fixture frame members of angular cross-sectional construction, means rigidly securing the frame members at right angles to each other and with their adjacent ends spaced apart, work clamping means carried by each of said fixture members and adapted for clamping individual work to each member for assembly in the fixture, a latch bar pivoted to one of the fixture frame members and lockably engaged in bridging relation with the other fixture frame member, a center stop including a threaded shank adjustably carried by the latch bar and having a tapered head movable inwardly and outwardly between the adjacent ends of the frame members for engaging both meeting ends of the work, and a diametrically enlarged member carried by the shank of the stop for adjustment toward and away from the latch bar and adapted to receive a feeler gauge therebetween to gauge the adjustment of the head of the stop.

4. The combination of claim 1 wherein said clamping means comprises an arm swivelly connected to the fixture for universal movement into and out of a position overlying the work, and a work clamping screw carried by the arm.

References Cited in the file of this patent

UNITED STATES PATENTS

| | | |
|---|---|---|
| 2,165,322 | Weston | July 11, 1939 |
| 2,417,144 | Trimble | Mar. 11, 1947 |